(12) United States Patent
Mohtar et al.

(10) Patent No.: US 10,876,467 B2
(45) Date of Patent: Dec. 29, 2020

(54) METHOD FOR CONTROLLING AN INLET-ADJUSTMENT MECHANISM FOR A TURBOCHARGER COMPRESSOR

(71) Applicant: Honeywell International Inc., Morris Plains, NJ (US)

(72) Inventors: Hani Mohtar, Chaumousey (FR); Louis Philippe de Araujo, Girancourt (FR); Stephane Pees, Ceintrey (FR); Daniele Zecchetti, Sindelfingen (DE); Michael Robert Uchanski, Vevey (CH)

(73) Assignee: Garrett Transportation I Inc., Torrance, CA (US)

( * ) Notice: Subject to any disclaimer, the term of this patent is extended or adjusted under 35 U.S.C. 154(b) by 319 days.

(21) Appl. No.: 15/972,987

(22) Filed: May 7, 2018

(65) Prior Publication Data

US 2019/0338699 A1 Nov. 7, 2019

(51) Int. Cl.
| | |
|---|---|
| *F02B 37/22* | (2006.01) |
| *F04D 27/02* | (2006.01) |
| *F04D 29/46* | (2006.01) |
| *F02B 37/12* | (2006.01) |
| *F04D 29/44* | (2006.01) |

(52) U.S. Cl.
CPC ........ *F02B 37/225* (2013.01); *F04D 27/0246* (2013.01); *F04D 27/0253* (2013.01); *F04D 29/462* (2013.01); *F02B 2037/125* (2013.01); *F04D 29/441* (2013.01)

(58) Field of Classification Search
CPC ............................... F02B 37/225; F02B 39/16
See application file for complete search history.

(56) References Cited

U.S. PATENT DOCUMENTS

| | | | |
|---|---|---|---|
| 2007/0095063 A1* | 5/2007 | Mischler | F02B 39/16 60/605.1 |
| 2007/0125082 A1* | 6/2007 | Sumser | F02B 37/225 60/599 |
| 2017/0152862 A1 | 6/2017 | Houst et al. | |

FOREIGN PATENT DOCUMENTS

| | | |
|---|---|---|
| DE | 102008028298 A1 | 12/2009 |
| DE | 102010026176 A1 | 1/2012 |
| DE | 102011121996 B4 | 6/2013 |
| DE | 102012011423 B3 | 11/2013 |
| EP | 2628918 A1 | 8/2013 |
| GB | 957884 A | 5/1964 |
| WO | 2013074503 A1 | 5/2013 |

* cited by examiner

*Primary Examiner* — Ngoc T Nguyen
(74) *Attorney, Agent, or Firm* — John C. James

(57) ABSTRACT

A method for controlling an inlet-adjustment mechanism in an air inlet for a compressor so as to switch the mechanism between open and closed positions for adjusting a flow area of the inlet. The method includes an algorithm for determining when the inlet-adjustment mechanism is in a failure mode. In accordance with the method, when the operating point on the compressor map is on the high-flow side of a threshold line at which the inlet-adjustment mechanism is switched from one position to the other, a measured speed or pressure ratio is compared to a theoretical value for the speed or pressure ratio based on a compressor map for the open position of the mechanism. If the measured value differs from the theoretical value by more than a predetermined tolerance, a failure mode is indicated.

6 Claims, 9 Drawing Sheets

METHOD FOR CONTROLLING AN INLET-ADJUSTMENT MECHANISM FOR A TURBOCHARGER COMPRESSOR

BACKGROUND OF THE INVENTION

The present disclosure relates to compressors, such as used in turbochargers, and more particularly relates to compressors in which the effective inlet area or diameter can be adjusted for different operating points.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio PR (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

One scheme for shifting the surge line of a centrifugal compressor to the left (i.e., surge is delayed to a lower flow rate at a given pressure ratio) and for shifting the choke flow line to the right (i.e., choke flow increases to a higher flow rate at a given pressure ratio) is to employ an inlet-adjustment mechanism in the compressor inlet. Applicant is the owner of co-pending applications disclosing various inlet-adjustment mechanisms of this type, see, e.g., application Ser. Nos. 14/537,339; 14/532,278; 14/642,825; 14/573,603; and Ser. No. 14/551,218; the entire disclosures of said applications being hereby incorporated herein by reference.

The present disclosure relates to methods for controlling such an inlet-adjustment mechanism.

BRIEF SUMMARY OF THE DISCLOSURE

The present disclosure describes a method for use with an inlet-adjustment mechanism in an air inlet of a compressor. The method includes a failure mode detection algorithm for determining when the inlet-adjustment mechanism is likely not functioning correctly. In accordance with one embodiment, the method includes the steps of:

identifying a threshold line on a compressor map specifying interrelationships between compressor pressure ratio PR, flow rate W, and turbocharger speed N, the threshold line being a line at which the inlet-adjustment mechanism is to be switched between the open position and the closed position when an operating point of the compressor on the compressor map reaches the threshold line;

determining a measured compressor flow rate $W_m$, a measured compressor pressure ratio $PR_m$, and one of a measured turbocharger speed Nm and a measured engine speed $Ne_m$ for a current operating point of the turbocharger and engine;

determining a theoretical value for a characteristic compressor performance parameter $\mathscr{P}$ for the current operating point, where $\mathscr{P}$ is one of pressure ratio PR and turbocharger speed N and where the theoretical value for $\mathscr{P}$ is derived from a first compressor map $MAP_O$ specifying an interrelationship between flow rate W, pressure ratio PR, and one of turbocharger speed N and engine speed Ne, when the inlet-adjustment mechanism is open;

determining whether the current operating point is on a high-flow side of the threshold line or is on a low-flow side of the threshold line; and when the current operating point is determined to be on the high-flow side of the threshold line at which a desired state of the inlet-adjustment mechanism is open, if a measured value for $\mathscr{P}$ differs from the theoretical value for $\mathscr{P}$ by more than a predetermined tolerance, determining that the inlet-adjustment mechanism is in a failure mode.

When the current operating point is determined to be on the low-flow side of the threshold line at which a desired state of the inlet-adjustment mechanism is closed, the method includes the step of checking for flow instability at the compressor inlet. The check for instability can be performed using a flow meter and checking for instability in the measured flow rate, or alternatively using a pressure sensor and checking for instability in the measured pressure at the compressor inlet; still another alternative is to use a temperature sensor and check for instability in the measured temperature at the compressor inlet. If flow instability is detected, then from the open compressor map $MAP_O$ a flow rate $W_{S-O}$ at surge is deduced, at the measured compressor pressure ratio $PR_m$, and if $W_m$ differs from $W_{S-O}$ by less than a predetermined tolerance, it indicates that surge may be imminent.

In some embodiments, the method includes the step of taking action to prevent an overspeed condition of the turbocharger when a failure mode is indicated for an operating condition on the high-flow side of the threshold line.

In some embodiments, the method includes the step of taking action to prevent surge of the compressor when the operating point is too close to the surge line for the open position of the inlet-adjustment mechanism.

The compressor performance parameter $\mathscr{P}$ in some embodiments is turbocharger speed N. In such case, the measured turbocharger speed Nm is compared to the theoretical turbocharger speed $N_O$ derived from the map for the open position of the inlet-adjustment mechanism. If measured speed differs from theoretical by more than a predetermined tolerance, a failure mode (or dysfunction) of the mechanism is indicated.

In other embodiments, the performance parameter is the compressor pressure ratio PR. In this case, the measured pressure ratio $PR_m$ is compared to the theoretical value $PR_O$ derived from the map for the open position. If the measured value differs from the theoretical by more than a predetermined tolerance, a failure mode is indicated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
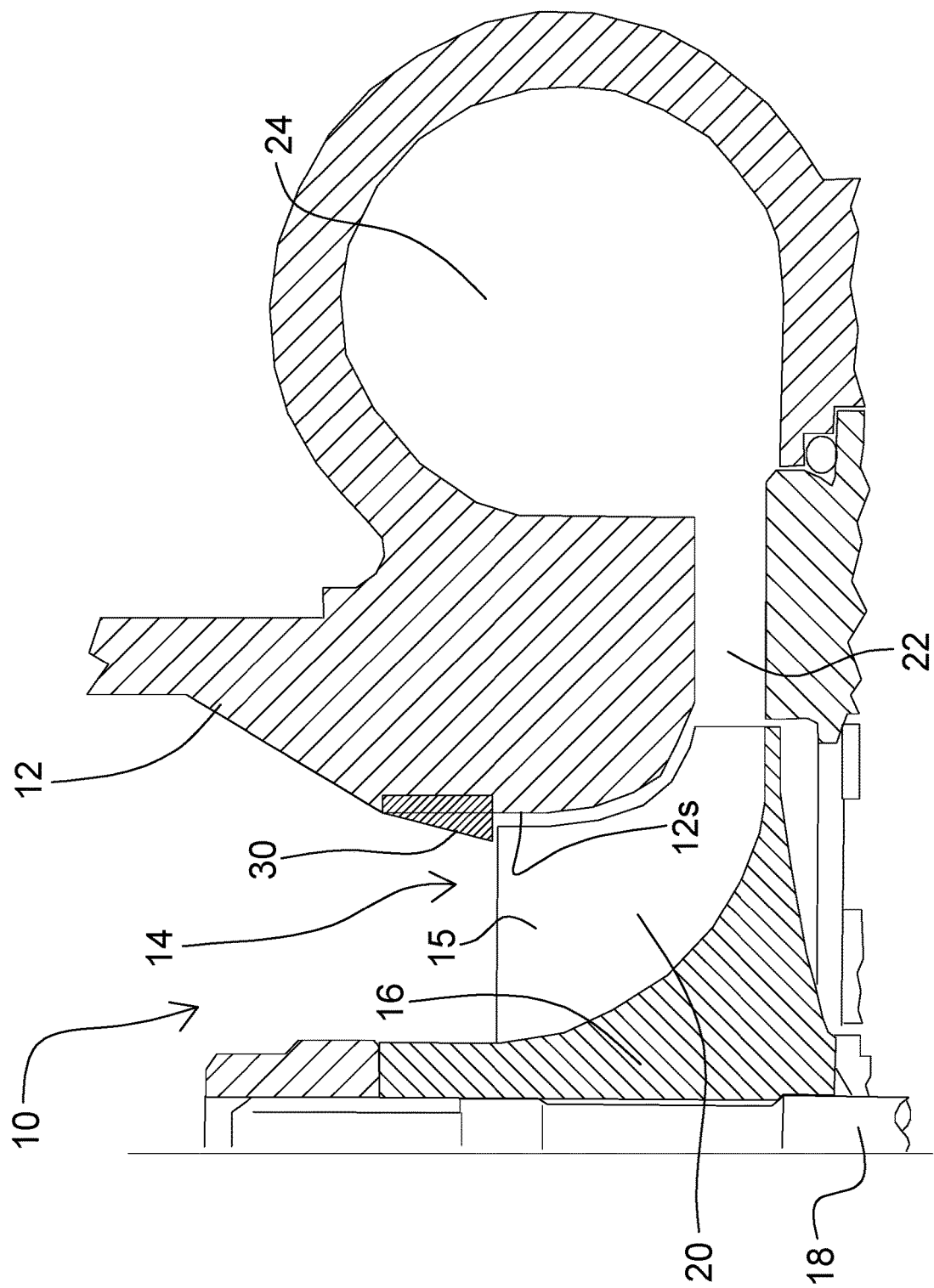
FIG. 1 is a diagrammatic depiction of a compressor having an inlet-adjustment mechanism, wherein the inlet-adjustment mechanism is in a closed position.
Figure 2:
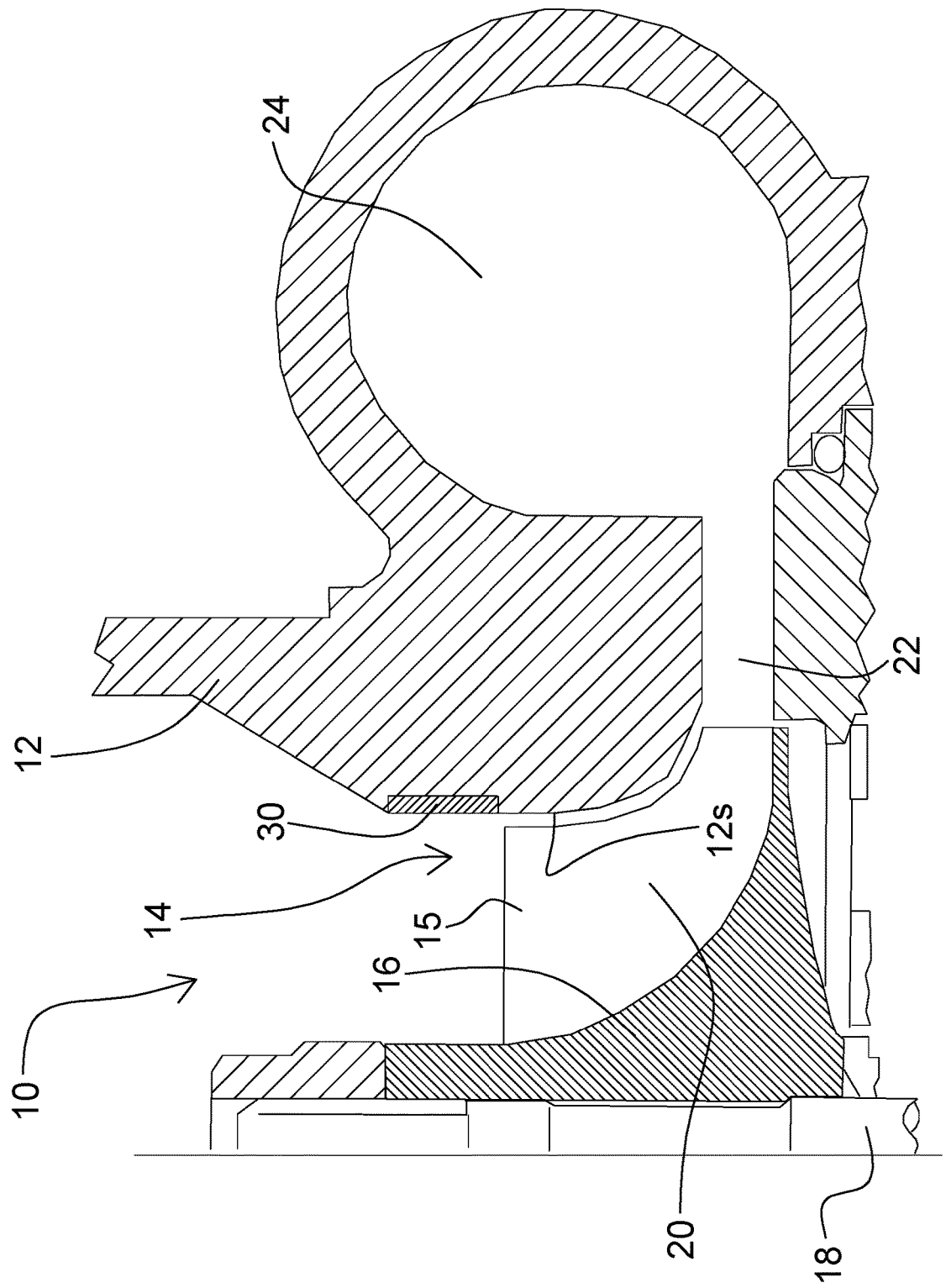
FIG. 2 is similar to FIG. 1 but shows the inlet-adjustment mechanism in an open position.
Figure 3:
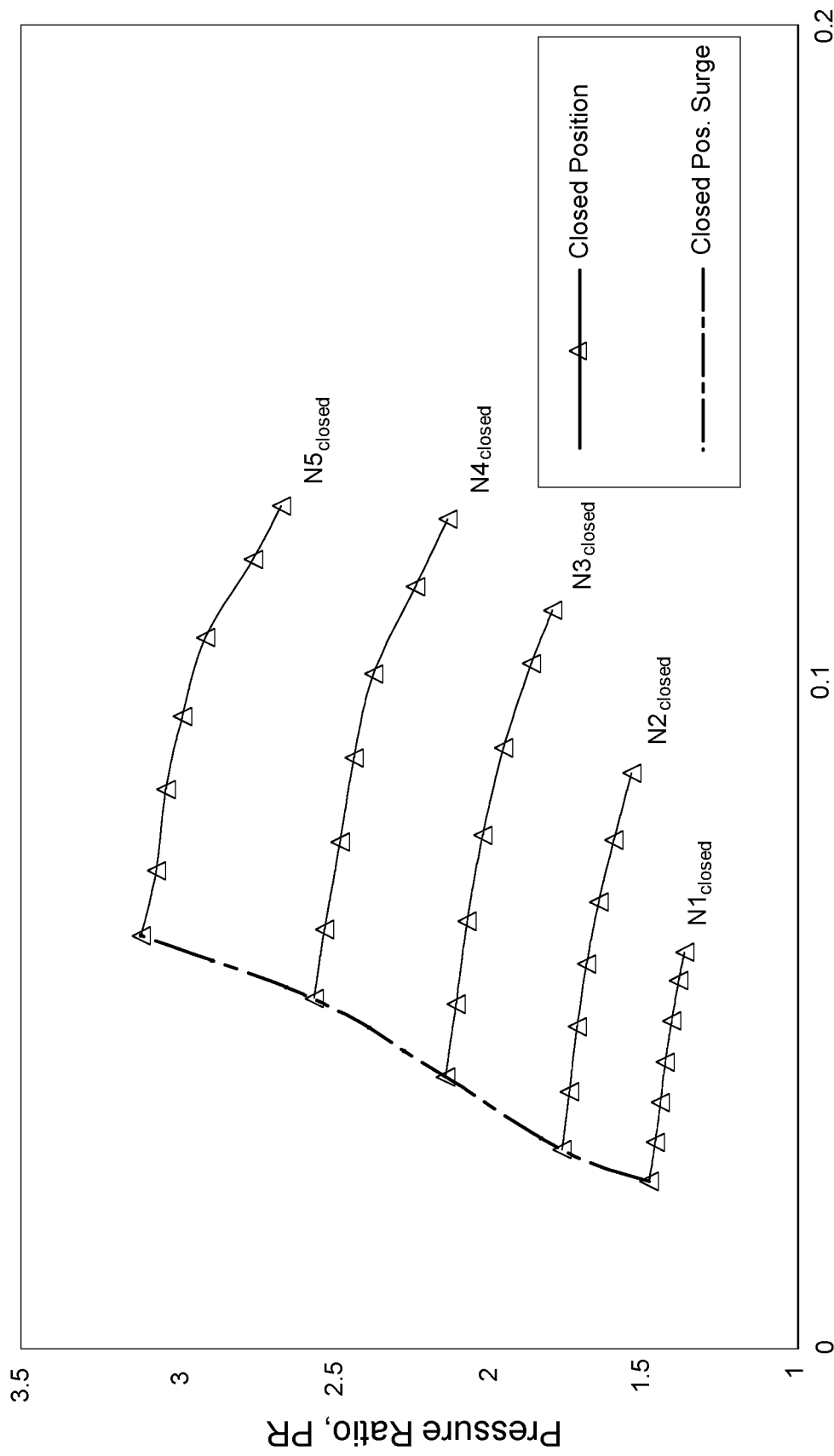
Figure 4:
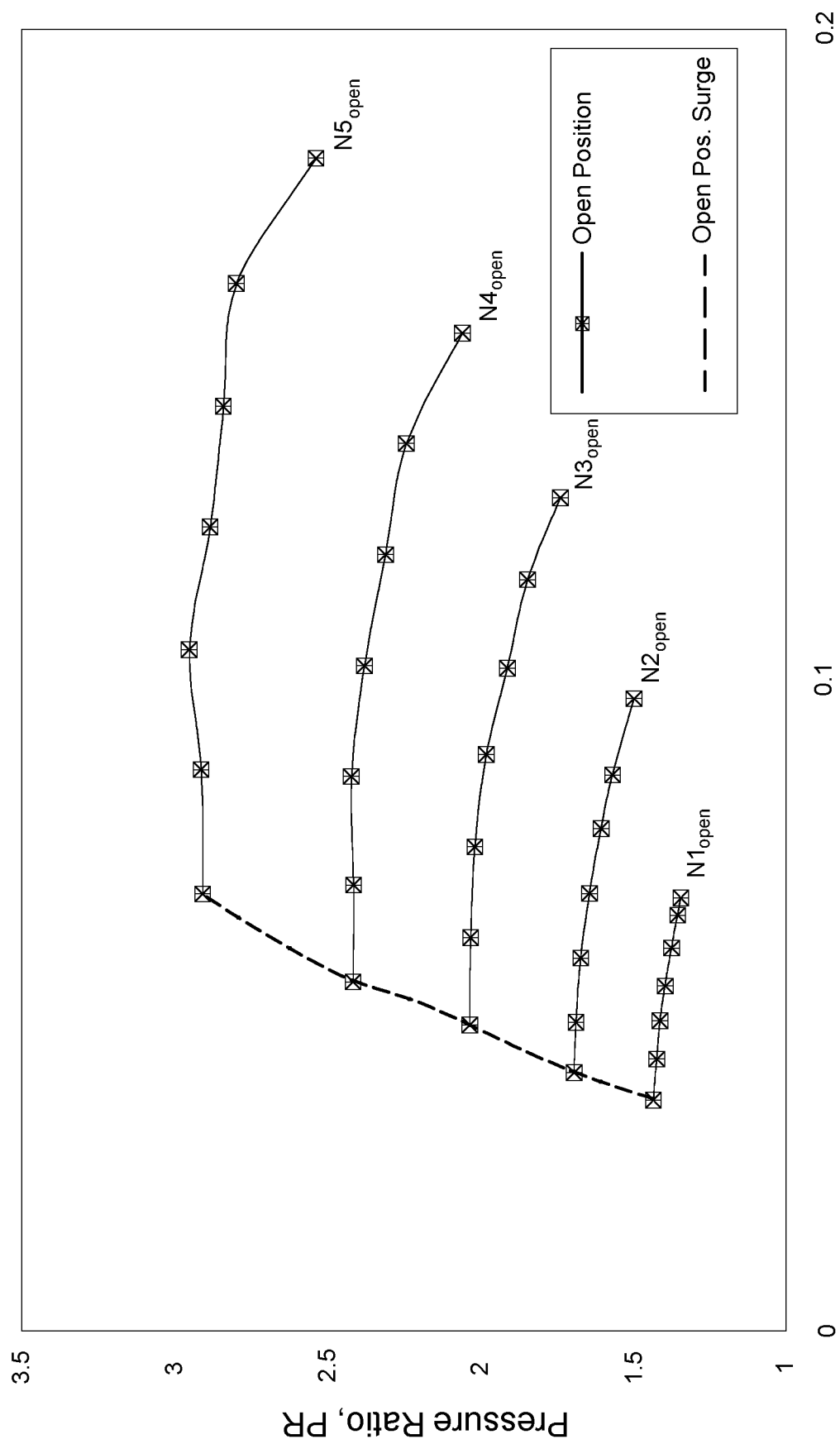
Figure 5:
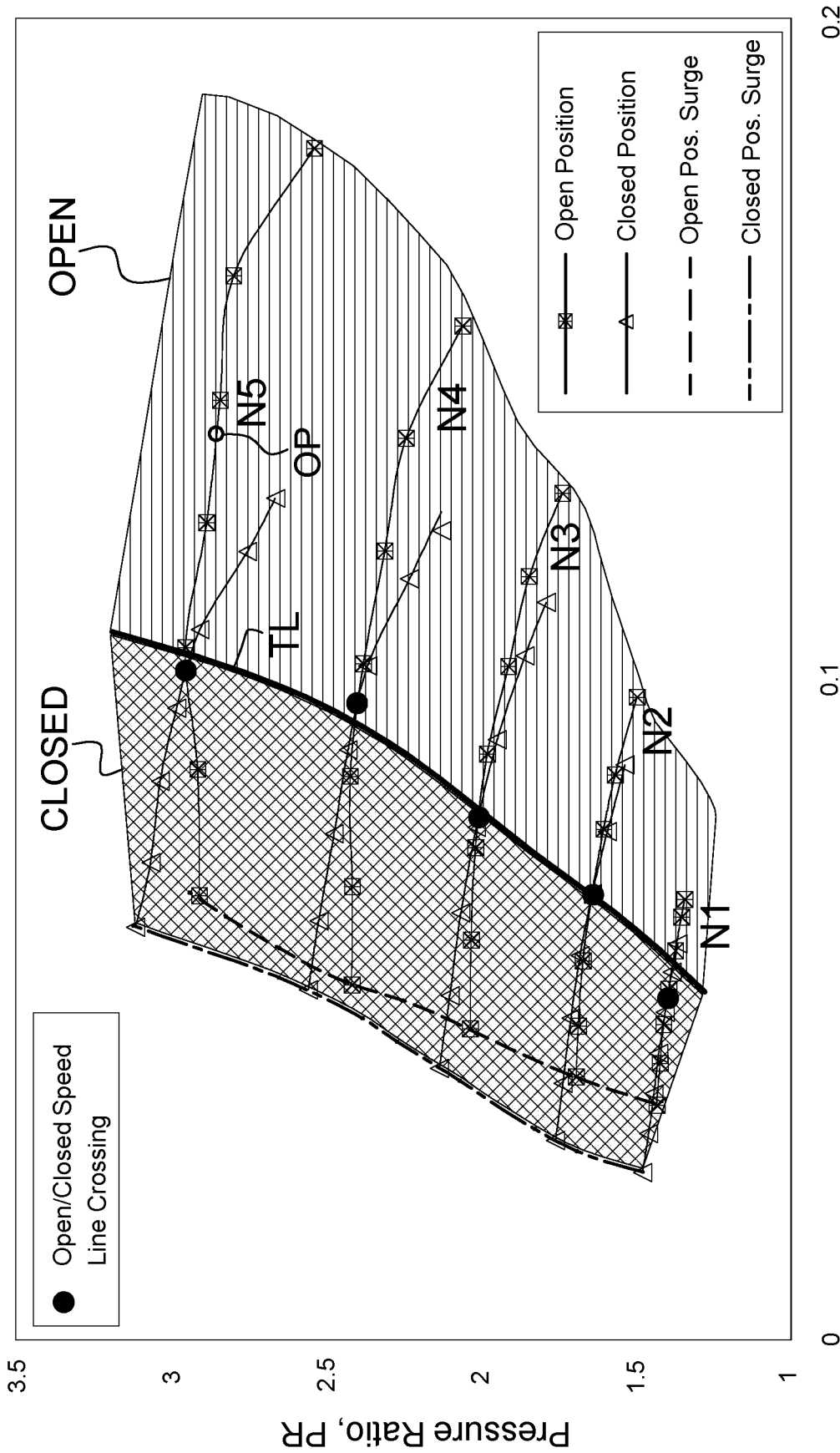
Figure 6:
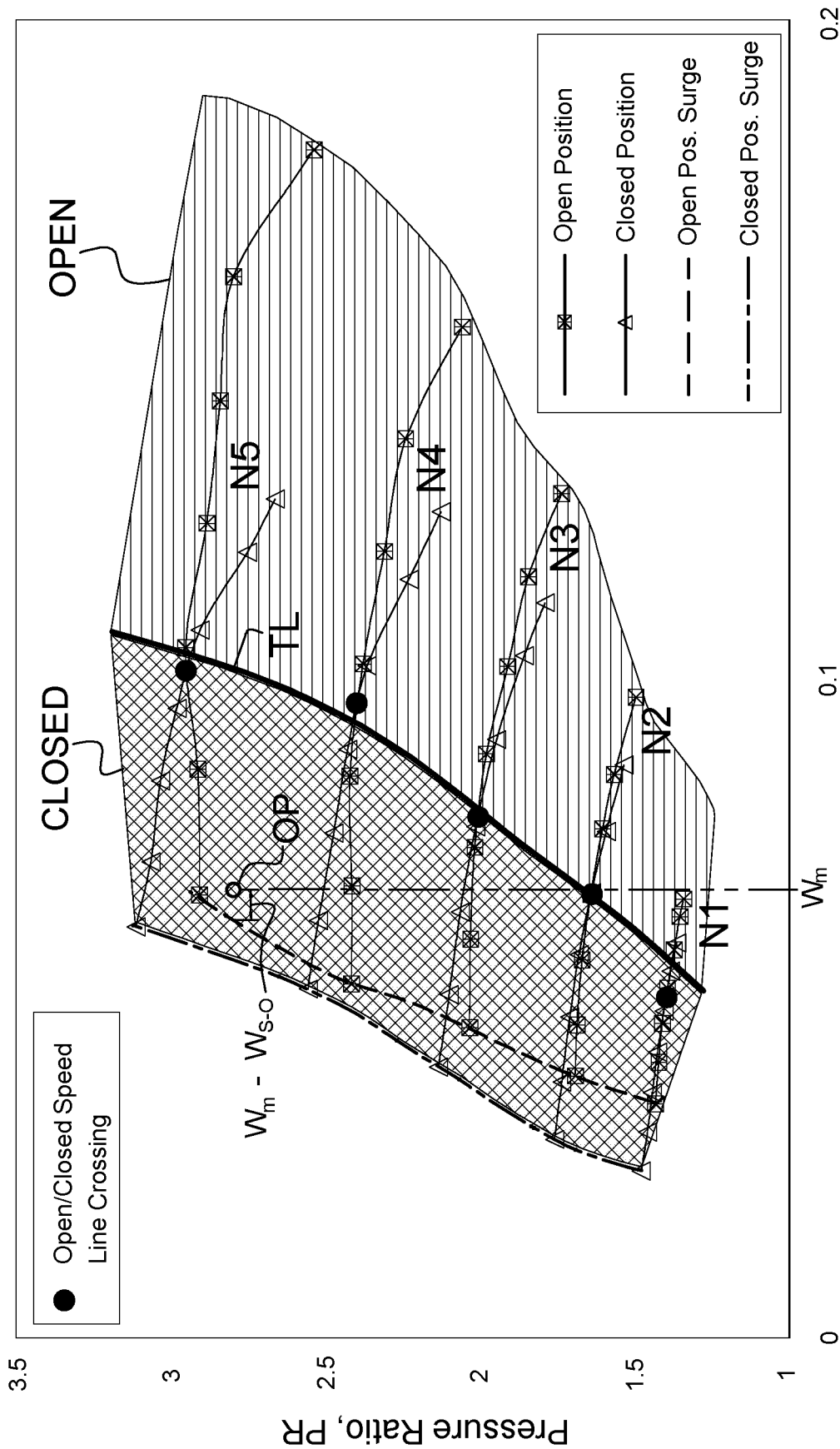
Figure 7:
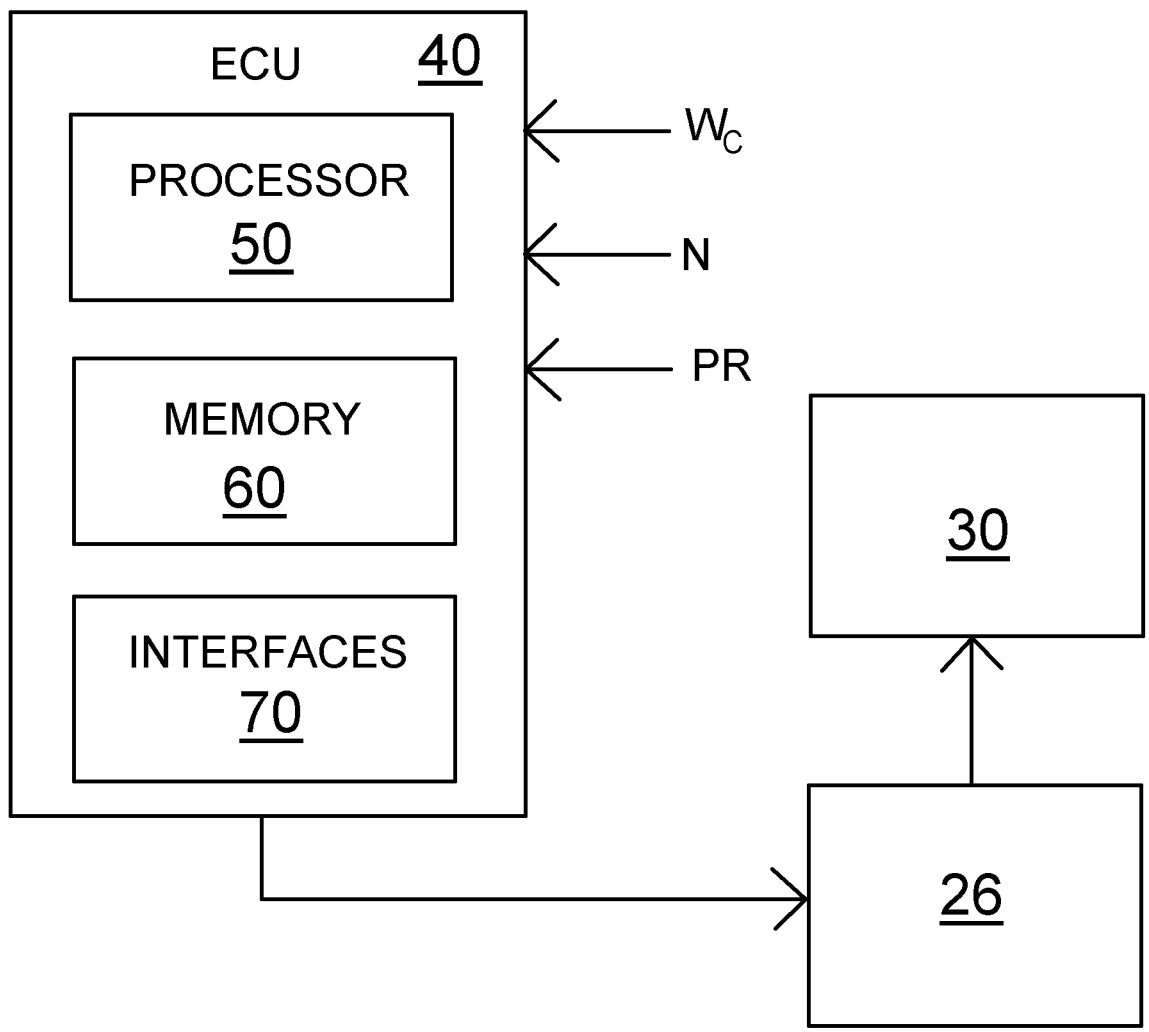
Figure 8:
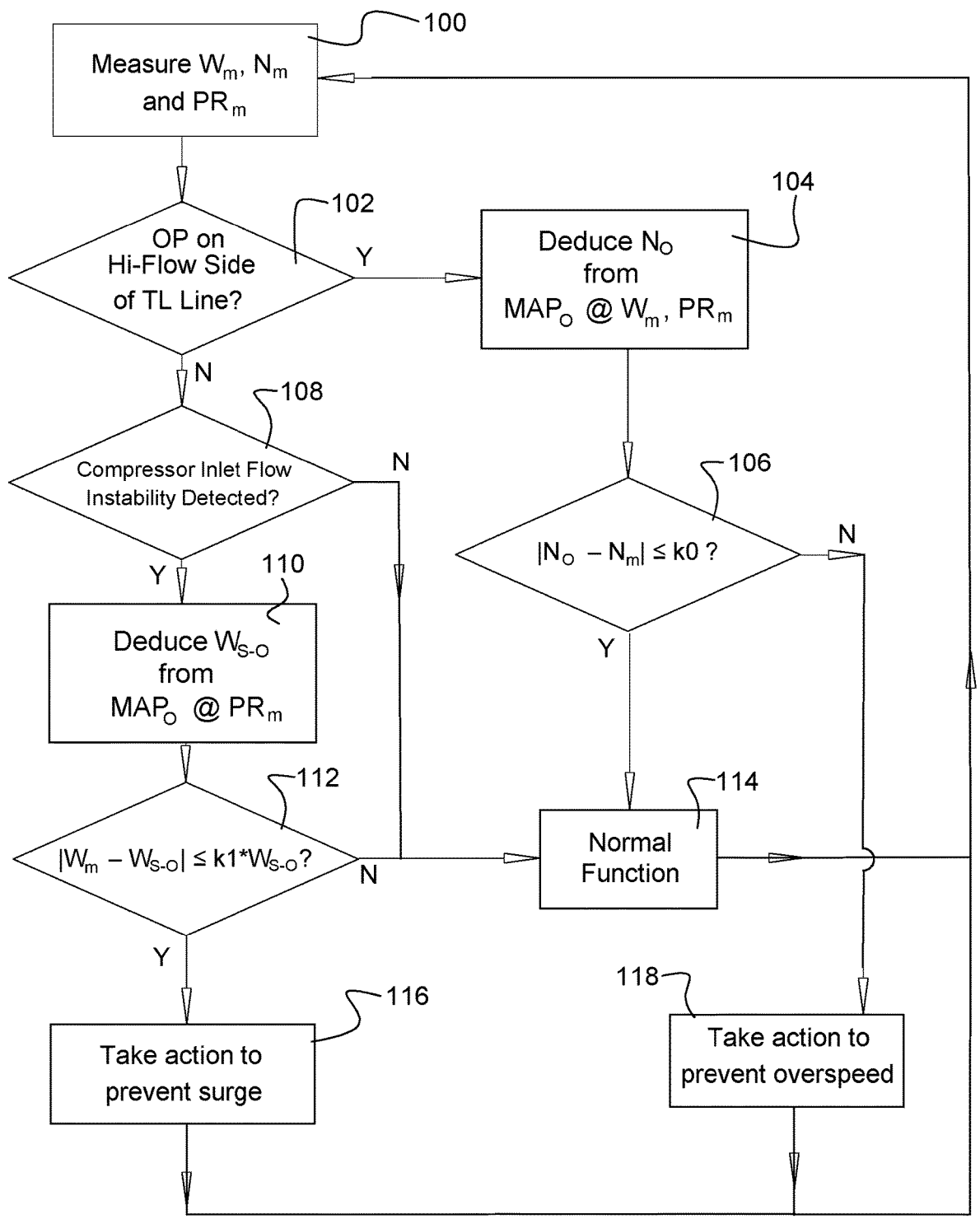
Figure 9:
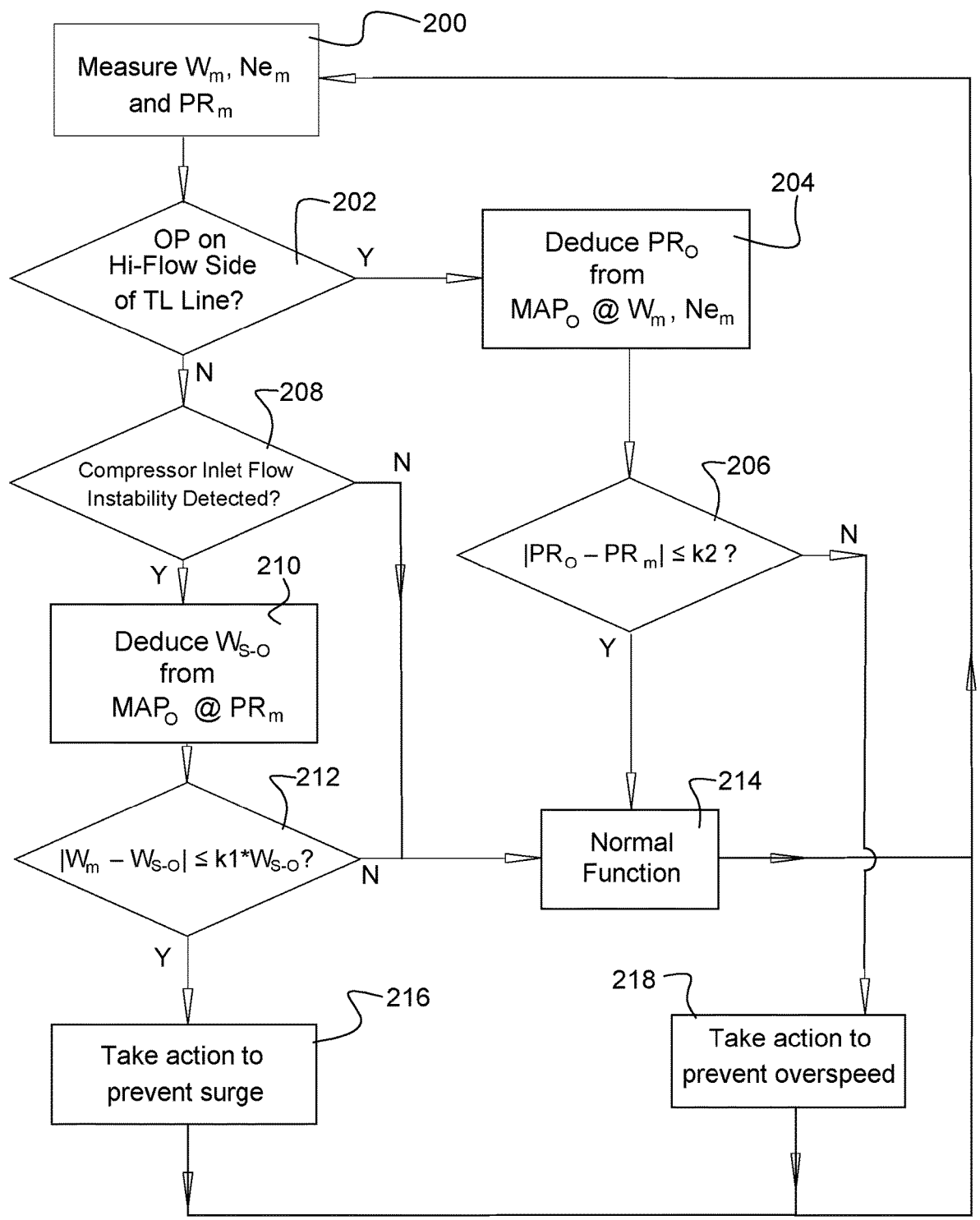

FIG. 3 schematically depicts a compressor map with the inlet-adjustment mechanism in the closed position corresponding to FIG. 1;

FIG. 4 schematically depicts a compressor map with the inlet-adjustment mechanism in the open position corresponding to FIG. 2;

FIG. 5 depicts a compressor map on which is identified a threshold line on which the inlet-adjustment mechanism is switched between its open and closed positions, and showing an operating point located on a high-flow side of the threshold line where the inlet-adjustment mechanism should normally be open, in accordance with one embodiment of the invention;

FIG. 6 is a compressor map identical to that of FIG. 5, but showing the operating point on the low-flow side of the threshold line where the inlet-adjustment mechanism should normally be closed;

FIG. 7 is a diagrammatic illustration of an engine control unit (ECU) in communication with an actuator that actuates the inlet-adjustment mechanism to move between the open and closed positions;

FIG. 8 is a flow chart illustrating a method in accordance with one embodiment of the invention; and FIG. 9 is a flow chart similar to FIG. 8, illustrating a method in accordance with another embodiment of the invention.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A compressor 10 for which a method in accordance with an embodiment of the invention may be employed is illustrated in cross-sectional view in FIGS. 1 and 2. The compressor 10 comprises a compressor housing 12 that defines an air inlet 14 extending along an axial direction of the compressor. A compressor wheel 15, comprising a hub 16 from which a plurality of blades 20 extend generally radially outwardly, is disposed in the compressor housing and is affixed to one end of a shaft 18 that is rotatably driven in a suitable manner (e.g., by an exhaust gas-driven turbine, not shown) for rotatably driving the compressor wheel 15. The compressor housing defines a diffuser 22 for receiving and diffusing air that is compressed as it passes through the compressor wheel. The diffuser delivers the diffused compressed air into a volute 24 defined by the compressor housing.

The compressor of the turbocharger includes an inlet-adjustment mechanism 30 disposed in the air inlet 14 of the compressor housing and movable between a closed position (FIG. 1) and an open position (FIG. 2). The inlet-adjustment mechanism comprises a variable-geometry orifice. The variable-geometry orifice in the closed position has an inner diameter that is smaller than an inner diameter of the shroud surface 12s of the compressor housing at the inducer portion of the compressor wheel, and the variable-geometry orifice is positioned such that the effective diameter of the air inlet at the inducer portion is determined by the inner diameter of the variable-geometry orifice. The variable-geometry orifice in the open position is moved such that an effective diameter of the air inlet at the inducer portion is determined by the shroud surface 12s. The movement of the mechanism 30 can entail axial sliding, pivotal movement, or helicoidal (screw-type) movement of the mechanism, to name a few non-limiting examples. The details of the structure and operation of the inlet-adjustment mechanism 30 are not pertinent to the present disclosure, and any mechanism that operates to effectively alter the flow area of the air inlet 14 leading into the compressor wheel 15 can be employed in the practice of the present invention.

The inlet-adjustment mechanism 30 enables adjustment of the effective size or diameter of the inlet into the compressor wheel 15. As illustrated in FIG. 2, when the inlet-adjustment mechanism is in the open position, the effective diameter of the inlet into the compressor wheel is relatively increased compared to the effective diameter in the closed position of FIG. 1. In order for this effect to be achieved, the axial spacing distance from the mechanism 30 to the compressor wheel must be as small as practicable.

At intermediate and high flow rates, the inlet-adjustment mechanism 30 can be placed in the open position as in FIG.

2. This can have the effect of increasing the effective inlet diameter and thus of reducing the flow velocity into the compressor wheel. FIG. 4 illustrates an exemplary compressor map for the open position of FIG. 2. The map is in the form of compressor pressure ratio PR (discharge pressure divided by inlet pressure) versus corrected flow rate $W_C$ (e.g., mass flow rate corrected to standard temperature and pressure inlet conditions). The map includes a series of constant-speed lines $N1_{open}$, $N2_{open}$, $N3_{open}$, $N4_{open}$, and $N5_{open}$ at each of which the compressor rotational speed is held constant while corrected flow and pressure ratio vary. The map includes an open-position surge line, which is the locus of points at which surge of the compressor is imminent; i.e., if the flow were reduced at the same pressure ratio, or the pressure ratio were increased at the same flow, the compressor would experience surge.

At low flow rates, the inlet-adjustment mechanism 30 can be placed in the closed position of FIG. 1. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate). This is illustrated in FIG. 3, showing the compressor map for the closed position. The closed-position map has the same values of speed lines. That is, the value of $N1_{closed}$ is equal to the value of $N1_{open}$, and the same is true for the other speeds.

The compressor maps of FIGS. 3 and 4 can be based on test data for the compressor operated with the inlet-adjustment mechanism respectively in the closed position and in the open position. Alternatively, the compressor maps can be based on model-predicted data for the compressor with the inlet-adjustment mechanism respectively in the closed position and in the open position.

FIG. 5 is a map that superimposes the speed lines for the closed position of FIG. 1, and the speed lines for the open position of FIG. 2. It will be seen that for a given compressor speed, the respective closed-position and open-position speed lines cross each other at a point denoted by a solid black circle in FIG. 5. This means that at the pressure ratio and corrected flow condition where the speed lines cross, the inlet-adjustment mechanism can be switched from one of its two positions to the other without there being any significant effect on the flow rate and pressure ratio of the compressor.

This characteristic speed-line crossing feature can be taken advantage of in designing the control scheme for controlling the operation of the inlet-adjustment mechanism. By establishing a "threshold" line TL on the superimposed maps in FIG. 5, representing a "best fit" of the speed-line crossing points, the operation of the inlet-adjustment mechanism can be regulated with reference to where on the compressor map the compressor is operating, and in particular where the operating point is located with respect to the threshold line. When the compressor is operating in a region located to the left of the threshold line TL in FIG. 5 (referred to as the low-flow side of the threshold line), the inlet-adjustment mechanism can be placed in the closed position of FIG. 1. When the compressor is operating to the right of the threshold line, in the region denoted as the high-flow side of the threshold line, the inlet-adjustment mechanism can be placed in the open position of FIG. 2. By switching between the closed and open positions when the operating point moves so as to cross the threshold line, the transition from one position to the other will not cause any sudden change in compressor flow rate and pressure ratio.

Implementation of the above-described control scheme can be accomplished in various ways. FIG. 7 illustrates the general architecture of a system for controlling the inlet-adjustment mechanism 30. An actuator 26 of suitable type is coupled to the inlet-adjustment mechanism. The actuator can operate on any of various principles; for example, the actuator can employ an electric motor, a pneumatic device, a hydraulic device, or the like, for imparting movement to the inlet-adjustment mechanism to move it between its closed and open positions. The actuator 26 is in communication with a control unit 40. The control unit includes a processor 50 (such as a microprocessor), a memory 60 (such as non-volatile ROM, PROM, EPROM, or EEPROM memory), and interfaces 70 for communicating with other devices in the system. The memory can be programmed (e.g., in hardware and/or firmware and/or software) with control instructions that are executed by the processor for carrying out the functions of the control unit.

In an embodiment, the engine includes an engine control unit or ECU such as present on vehicles such as automobiles and trucks. The ECU is an electronic control unit that may include hardware and/or software components configured to control various aspects of engine operation. In particular, the ECU may receive inputs from various engine sensors and turbocharger sensors and control various engine and turbocharger actuators. The engine sensors may be disposed at various points in the engine to measure or otherwise determine corresponding engine parameters. Examples of engine sensors may include a throttle position sensor, air temperature sensor, engine revolutions per minute (RPM) sensor, engine load sensor, accelerator pedal position sensor and/or others. The engine actuators may include various relays, solenoids, ignition coils, or other electrically operable devices that may be used to control corresponding engine parameters. The turbocharger sensors may include sensors for measuring turbocharger rotational speed, compressor inlet pressure, compressor discharge pressure, compressor corrected flow rate, and other parameters.

In an exemplary embodiment as shown in FIG. 7, the ECU 40 may include an antisurge control module for regulating the position of the inlet-adjustment mechanism 30. The antisurge control module may be any means such as a device or circuitry embodied in hardware, software or a combination of hardware and software that is configured to perform the corresponding functions of the antisurge control module as described herein. In some embodiments, the antisurge control module may be configured to augment ECU capabilities with respect to surge prevention by identifying engine conditions under which action is to be taken for antisurge activity and with respect to taking or directing actions (e.g., via control of the actuator 26 for inlet-adjustment mechanism 30) with respect to antisurge activity. As such, in an exemplary embodiment, the antisurge control module may merely provide additional functionality to the ECU 40. However, in some embodiments, the antisurge control module may be a separate unit from the ECU (i.e., the control unit 40 shown in FIG. 6 may not comprise the ECU but may be in communication with the ECU).

The memory device 60 may include, for example, volatile and/or non-volatile memory. The memory device 60 may be configured to store information, data, applications, modules, instructions, or the like for enabling the apparatus to carry out various functions in accordance with exemplary embodiments of the present invention. For example, the memory device 60 could be configured to buffer input data for processing by the processor 50. Additionally or alternatively, the memory device 60 could be configured to store instructions corresponding to an application for execution by the processor 50.

The processor 50 may be a processor of the ECU or a co-processor or processor of a separate antisurge control module. The processor 50 may be embodied in a number of different ways. For example, the processor 50 may be embodied as a processing element, a coprocessor, a controller, or various other processing means or devices including integrated circuits such as, for example, an ASIC (application specific integrated circuit), FPGA (field programmable gate array) a hardware accelerator or the like. In an exemplary embodiment, the processor 50 may be configured to execute instructions stored in the memory device 60 or otherwise accessible to the processor 50. As such, whether configured by hardware or software methods, or by a combination thereof, the processor 50 may represent an entity capable of performing operations according to embodiments of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50, which may otherwise be a general-purpose processing element if not for the specific configuration provided by the instructions, to perform the algorithms and/or operations described herein. However, in some cases, the processor 50 may be a processor of a specific device (e.g., the ECU) adapted for employing embodiments of the present invention by further configuration of the processor 50 by instructions for performing the algorithms and/or operations described herein (e.g., by addition of the antisurge control module).

The memory 60 of the control unit stores a first compressor map such as the map corresponding to the open position of the inlet-adjustment mechanism as shown in of FIG. 3, and a second compressor map such as the map corresponding to the closed position of the inlet-adjustment mechanism as shown in FIG. 4. The maps can be stored in any of various forms such as a look-up table that includes the variables of flow W versus pressure ratio PR along a series of constant-speed lines N1, N2, N3, etc. The speeds can be the turbocharger speeds, Nt, or alternatively can be engine speeds, Ne. The memory also stores the threshold line TL representing a curve-fit of speed-line crossing points derived in the manner previously described. The threshold line can be stored in any of various forms, such as a table of PR versus W or a polynomial formula expressing PR as a function of W. Alternatively the threshold line can be represented by flow W versus engine speed Ne. The processor 50 receives inputs of compressor flow rate W, engine speed Ne, and compressor pressure ratio PR. The flow rate, engine speed, and pressure ratio are continually sensed by suitable sensors and the sensed values are sent to the processor (e.g., at regular time-step intervals such as every 0.1 second or other suitably selected interval). Additional parameters may be sensed and sent to the processor for use in controlling the inlet-adjustment mechanism, including but not limited to a time rate of change of engine speed $\Delta Ne/\Delta t$ (or alternatively time rate of change of turbocharger speed $\Delta Nt/\Delta t$). The processor uses these sensed parameters to control the inlet-adjustment mechanism and to detect a failure mode of the inlet-adjustment mechanism, as further described below.

The method for controlling the inlet-adjustment mechanism may be carried out in accordance with Applicant's co-pending U.S. application Ser. No. 15/925,713 filed on Mar. 19, 2018, the entire disclosure of which is hereby incorporated herein by reference. While this method is effective for switching the inlet-adjustment mechanism between its open and closed positions at or close to the threshold line TL, there remains a possibility that the mechanism may fail to be switched as commanded. Various circumstances may cause such a failure, such as mechanical failure of the actuator for the inlet-adjustment mechanism, mechanical failure of the mechanism itself, binding of the mechanism because of an abnormal condition within the mechanism, etc. In any event, failure of the mechanism to switch to the commanded position can have potentially serious consequences. For example, when the operating point OP is on the low-flow side of the threshold line as in FIG. 6, the inlet-adjustment mechanism is supposed to be closed in order to shift the surge line to the left on the map. If a failure causes the mechanism to remain in the open position, it increases the likelihood of the compressor experiencing surge, which can damage the compressor.

On the other hand, when the operating point OP is on the high-flow side of the threshold line as in FIG. 5, the inlet-adjustment mechanism is supposed to be open. If a failure causes the mechanism to remain closed, it increases the likelihood of the compressor experiencing an overspeed condition, which can cause damage to various components of the turbocharger.

The aim of the present invention is to detect a failure mode of the inlet-adjustment mechanism, i.e., detect if the mechanism is open when it should be closed, or closed when it should be open, so that appropriate action can be taken to avoid surge or overspeed of the compressor. The method in accordance with embodiments of the invention is advantageous because it is simple in implementation, requiring no additional sensed parameters beyond those that are already needed for controlling the inlet-adjustment mechanism.

The method is now explained with initial reference to FIG. 5, showing a compressor map and a current operating point OP that is within the high-flow region of the map, in which the inlet-adjustment mechanism is supposed to be open. To implement the method, the control unit must have access to a first compressor map that applies when the inlet-adjustment mechanism is open, and optionally a second compressor map that applies when the inlet-adjustment mechanism is closed. On FIG. 5, speed lines from both maps are shown. For simplicity and clarity of explanation of the method, the operating point OP has been chosen so that it falls exactly on the N5 speed line of the first (open-mechanism) map, shown with square symbols. This map, of course, is the correct map for the compressor, if it is assumed that the inlet-adjustment mechanism is actually in the (correct) open position. Indeed, if the mechanism is open, the actual measured speed $N_m$ at the operating point should correspond to the map-predicted (or theoretical) speed value of N5, as can be seen by comparing its location to the N5 speed line for the open-mechanism map. Correspondingly, if the operating point is located on the map based on speed N and flow W, the measured compressor pressure ratio $PR_m$ should correspond to the map-predicted (or theoretical) pressure ratio.

The method in accordance with the invention entails (1) determining a theoretical value for a characteristic compressor performance parameter $\mathscr{P}$ for the current operating point, where $\mathscr{P}$ is one of PR and N and where the theoretical value for $\mathscr{P}$ is derived from a first compressor map $MAP_O$ specifying an interrelationship between W, PR, and N when the inlet-adjustment mechanism is open; (2) determining whether the current operating point is on a high-flow side of the threshold line or is on a low-flow side of the threshold line; and (3) when the current operating point is determined to be on the high-flow side of the threshold line at which a desired state of the inlet-adjustment mechanism is open, if a measured value for $\mathscr{P}$ differs from the theoretical value for $\mathscr{P}$ by more than a predetermined tolerance, determining that the inlet-adjustment mechanism is in a failure mode.

In the example shown in FIG. 5, where turbocharger speed N is used as the characteristic performance parameter, when the operating point is on the high-flow side of the threshold line TL, the actual measured speed, $N_m$, is determined, and is compared to the theoretical speed $N_O$ derived from the first open-mechanism map. If the actual speed is within an acceptably small tolerance of $N_O$, it indicates that the mechanism is open as it should be, and hence there is no failure condition. In FIG. 5, if the actual speed $N_m$ is measured to equal N5 or within an acceptable tolerance of N5, then the mechanism is operating normally and no action to avoid overspeed is needed. On the other hand, if is assumed that the measured speed differs from N5 by more than the tolerance, then there is a dysfunction, and action to avoid overspeed may be needed.

Referring now to FIG. 6, the operating point OP is on the low-flow side of the threshold line. In the low-flow region, the inlet-adjustment mechanism should be closed. In one embodiment of the invention, the same speed-checking strategy as used in the high-flow region can also be used in the low-flow region. Thus, the measured actual speed $N_m$ can be compared to the theoretical speed $N_{CL}$ from the closed-mechanism map $MAP_{CL}$, and if $N_m$ is within a predetermined tolerance of $N_{CL}$, then the mechanism is functioning properly, and no failure condition exists. But if $N_m$ is compared with the theoretical speed $N_O$ from the open-mechanism map $MAP_O$ and is within a predetermined tolerance of $N_O$, it indicates that the mechanism is actually open and a failure condition exists.

In another embodiment of the invention as illustrated in FIG. 6, a simpler algorithm is employed. A flow meter is used for measuring flow rate at the compressor inlet, or alternatively a pressure sensor or temperature sensor is used for measuring pressure or temperature in the inlet. If no instability is detected, then normal functioning is indicated. If there is instability in the measured flow rate or pressure or temperature, it indicates that surge may be imminent. To verify, the measured compressor flow rate $W_m$ is compared to the flow rate that would exist at the surge line (at the same pressure ratio PR) for the open-mechanism map, said flow rate being denoted $W_{S-O}$. If the difference in flow is less than a predetermined tolerance, it indicates there is potentially a risk of compressor surge, because if the inlet-adjustment mechanism has malfunctioned and is open, then the operating point OP is close to the surge line. Accordingly, action can be taken to avoid surge.

FIG. 8 depicts a flow chart of a method in accordance with one embodiment of the invention, which is suitable for systems in which there is a speed sensor on the turbocharger for detecting turbocharger rotational speed N. The steps shown in the flow chart are performed iteratively at a series of time steps, the time interval between iterations being chosen to be suitably small to enable the controller to regulate transient behavior of the inlet-adjustment mechanism and the compressor. At a step 100, measured values are determined for the compressor flow rate $W_m$, compressor pressure ratio $PR_m$, and turbocharger speed $N_m$ for the current time step (i.e., current operating point OP of the compressor) by suitable sensors, and are provided to the control unit. At a subsequent step 102, it is queried whether the current operating point is on the high-flow side of the threshold line. If the answer is "yes" then the desired position of the inlet-adjustment mechanism is open. Thus, at a following step 104, the theoretical turbocharger speed $N_O$ at the measured flow $W_m$ and measured pressure ratio $PR_m$ is deduced using the open-mechanism map $MAP_O$. At step 106 it is queried whether the measured speed is within a tolerance of the theoretical open-position speed, or in symbolic terms, is $|N_O-N_m|\leq k0$? (where k0 is a tolerance value). If the answer is "yes" then it means that the inlet-adjustment mechanism is open, indicating normal function as shown at block 114, so no action is taken, and the routine returns to step 102 for the next iteration.

If the answer at step 106 is "no" then it indicates something is abnormal with respect to the inlet-adjustment mechanism, which could increase the likelihood of a compressor overspeed condition, so at step 118 action is taken to prevent overspeed, and the routine returns to step 100.

At query step 102, if the operating point is not on the high-flow side of the threshold line TL, then at step 108 a check for flow instability at the compressor inlet is made, as previously described. If there is no flow instability detected, then it indicates no surge risk (normal functioning as shown at 114) and the routine returns to step 100. If flow instability is detected, then at subsequent step 110 the flow rate at the surge line for the open-mechanism map, $W_{S-O}$, is deduced using the map $MAP_O$ for the open position of the inlet-adjustment mechanism, at the measured pressure ratio $PR_m$. At a step 112, it is queried whether the measured flow is different from the surge flow by less than a predetermined tolerance, or in symbolic terms, is $|W_m-W_{S-O}|\leq k1*W_{S-O}$? (where k1 is a tolerance value). If the answer is "no" then it means that there is normal function (low risk of surge) as shown at block 114, so no action is taken, and the routine returns to step 100 for the next iteration. If the answer at step 112 is "yes" then it indicates a risk of a compressor surge condition, so at step 116 action is taken to prevent surge, and the routine returns to step 100.

The tolerance values k0 and k1 are suitably chosen to provide reliable indications of normal function or dysfunction of the inlet-adjustment mechanism and the minimize the risk of surge. To minimize the occurrence of false indications of dysfunction in the high-flow region where compressor overspeed is the risk, generally a smaller value of the tolerance value k0 would be used, but if it is too small then real dysfunction events may be missed. Accordingly, the tolerance value k0 is chosen to strike a balance between these two considerations. To minimize the risk of compressor surge in the low-flow region, generally a larger value of k1 would be used, but if the value is too large then the strategy would be overly conservative, and action to avoid surge may be taken when in reality the compressor is not in danger of surge. If the value of k1 is too small, then the risk of surge occurring is increased. Accordingly, the value of k1 is chosen so as to strike a suitable balance between these considerations.

FIG. 9 is a flow chart illustrating a method in accordance with another embodiment of the invention, which is applicable when there is no turbocharger speed sensor. This method is similar to that of FIG. 8, but instead of using turbocharger speed N as the characteristic compressor performance parameter that is compared to the theoretical map value when the operating point is on the high-flow side of the threshold line, the compressor pressure ratio PR is used instead. At a step 200, measured values are determined for the compressor flow rate $W_m$, compressor pressure ratio $PR_m$, and engine speed $Ne_m$ for the current operating point OP of the compressor by suitable sensors, and are provided to the control unit.

At a subsequent step 202, it is queried whether the current operating point is on the high-flow side of the threshold line. If the answer is "yes" then the desired position of the inlet-adjustment mechanism is open. Thus, at a following step 204, the theoretical pressure ratio $PR_O$ at the measured flow $W_m$ and measured engine speed $Ne_m$ is deduced using the open-mechanism map $MAP_O$. At step 206 it is queried whether the measured pressure ratio is within a tolerance of the theoretical open-position value, or in symbolic terms, is $|PR_O-PR_m| \le k2$? (where k2 is a tolerance value). If the answer is "yes" then it means that the inlet-adjustment mechanism is open, indicating normal function as shown at block 214, so no action is taken, and the routine returns to step 200 for the next iteration.

If the answer at step 206 is "no" then it indicates something is abnormal with respect to the inlet-adjustment mechanism, which could increase the likelihood of a compressor overspeed condition, so at step 218 action is taken to prevent overspeed, and the routine returns to step 200.

At query step 202, if the operating point is not on the high-flow side of the threshold line TL, then at subsequent step 208 a check is made for flow instability in the compressor inlet. If no instability is detected, it indicates normal function as at 114, and the routine returns to step 200. If flow instability is detected, then at step 210 the flow rate at the surge line for the open-mechanism map, $W_{S-O}$, is deduced using the map $MAP_O$ for the open position of the inlet-adjustment mechanism, at the measured pressure ratio $PR_m$. At a step 212, it is queried whether the measured flow is different from the surge flow by less than a predetermined tolerance, or in symbolic terms, is $|W_m-W_{S-O}|$? If the answer is "no" then it means that there is normal function (low risk of surge) as shown at block 214, so no action is taken, and the routine returns to step 200 for the next iteration. If the answer at step 212 is "yes" then it indicates a risk of a compressor surge condition, so at step 216 action is taken to prevent surge, and the routine returns to step 200.

At a given flow rate, the difference between $N_{OP}$ and $N_{CL}$ at low PR is significantly smaller than it is at high PR. Accordingly, in some embodiments of the invention, it may be advantageous for one or more of the tolerance values k0, k1, and k2 to be functions of the pressure ratio PR. Thus, for example, k0 can be relatively small at low pressure ratio and relatively large at high pressure ratio, and likewise for k1 and/or k2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of failure-detection for a compressor inlet-adjustment mechanism disposed in an air inlet defined by a compressor housing upstream of a compressor wheel of a compressor of a turbocharger for boosting intake pressure of an internal combustion engine, the inlet-adjustment mechanism comprising a variable-geometry orifice, the variable-geometry orifice in a closed position having an inner diameter that is smaller than an inner diameter of a shroud surface of the compressor housing at an inducer portion of the compressor wheel, the variable-geometry orifice being positioned such that an effective diameter of the air inlet at the inducer portion is determined by the inner diameter of the variable-geometry orifice, the variable-geometry orifice in the open position being moved such that the effective diameter of the air inlet at the inducer portion is determined by the shroud surface, the method comprising:

identifying a threshold line on a compressor map specifying interrelationships between compressor pressure ratio PR, flow rate W, and one of turbocharger speed N and engine speed Ne, the threshold line being a line at which the inlet-adjustment mechanism is to be switched between the open position and the closed position when an operating point of the compressor on the compressor map reaches the threshold line;

determining a measured compressor flow rate $W_m$, a measured compressor pressure ratio $PR_m$, and one of a measured turbocharger speed $N_m$ and a measured engine speed $Ne_m$ for a current operating point of the turbocharger and engine;

determining a theoretical value for a characteristic compressor performance parameter $\mathscr{P}$ for the current operating point, where $\mathscr{P}$ is one of PR and N and where the theoretical value for $\mathscr{P}$ is derived from a first compressor map $MAP_O$ specifying an interrelationship between flow rate W, pressure ratio PR, and one of turbocharger speed N and engine speed Ne, when the inlet-adjustment mechanism is open;

determining whether the current operating point is on a high-flow side of the threshold line or is on a low-flow side of the threshold line; and when the current operating point is determined to be on the high-flow side of the threshold line at which a desired state of the inlet-adjustment mechanism is open, if a measured value for $\mathscr{P}$ differs from the theoretical value for $\mathscr{P}$ by more than a predetermined tolerance, determining that the inlet-adjustment mechanism is in a failure mode, and if the measured value for $\mathscr{P}$ is within the predetermined tolerance of the theoretical value for $\mathscr{P}$, determining that the inlet-adjustment mechanism is operating normally.

2. The method of claim 1, further comprising:

when the current operating point is determined to be on the low-flow side of the threshold line at which a desired state of the inlet-adjustment mechanism is closed, checking for flow instability in the air inlet of the compressor, and if flow instability is detected, determining from the first compressor map $MAP_O$ a flow rate $W_{S-O}$ at surge, at the measured compressor pressure ratio PR, and if $W_m$ differs from $W_{S-O}$ by less than a predetermined tolerance, determining that there is a risk of surge, and if no flow instability is detected, determining that the inlet-adjustment mechanism is operating normally.

3. The method of claim 1, wherein the characteristic performance parameter $\mathscr{P}$ is turbocharger speed N.

4. The method of claim 1, wherein the characteristic performance parameter $\mathscr{P}$ is compressor pressure ratio PR.

5. A computer program product comprising at least one computer-readable storage medium having computer-executable program code instructions stored therein for controlling a compressor inlet-adjustment mechanism disposed in an air inlet defined by a compressor housing upstream of a compressor wheel of a compressor of a turbocharger for boosting intake pressure of an internal combustion engine, the inlet-adjustment mechanism comprising a variable-geometry orifice, the variable-geometry orifice in a closed position having an inner diameter that is smaller than an inner diameter of a shroud surface of the compressor housing at an inducer portion of the compressor wheel, the variable-geometry orifice being positioned such that an effective diameter of the air inlet at the inducer portion is determined by the inner diameter of the variable-geometry orifice, the variable-geometry orifice in the open position being moved such that the effective diameter of the air inlet at the inducer portion is determined by the shroud surface, the compressor having a compressor map specifying interrelationships between flow rate W, compressor pressure ratio PR, and one of turbocharger speed N and engine speed Ne, the compressor map including a threshold line at which the inlet-adjustment mechanism is to be switched between the open position and the closed position, the computer-executable program code instructions comprising:

program code instructions for determining a measured compressor flow rate $W_m$, a measured compressor pressure ratio PR, and one of a measured turbocharger speed $N_m$ and a measured engine speed $Ne_m$ for a current operating point of the turbocharger and engine;

program code instructions for determining a theoretical value for a characteristic compressor performance parameter $\mathscr{P}$ for the current operating point, where $\mathscr{P}$ is one of pressure ratio PR and turbocharger speed N and where the theoretical value for $\mathscr{P}$ is derived from a first compressor map $MAP_O$ specifying an interrelationship between flow rate W, pressure ratio PR, and one of turbocharger speed N and engine speed Ne, when the inlet-adjustment mechanism is open;

program code instructions for determining whether the current operating point is on a high-flow side of the threshold line or is on a low-flow side of the threshold line; and program code instructions for determining that the inlet-adjustment mechanism is in a failure mode when the current operating point is determined to be on the high-flow side of the threshold line at which a desired state of the inlet-adjustment mechanism is open and when a measured value for $\mathscr{P}$ differs from the theoretical value for $\mathscr{P}$ by more than a predetermined tolerance, and if the measured value for $\mathscr{P}$ is within the predetermined tolerance of the theoretical value for $\mathscr{P}$, determining that the inlet-adjustment mechanism is operating normally.

6. The computer program product of claim 5, further comprising program code instructions for checking for flow instability in the air inlet of the compressor when the current operating point is determined to be on the low-flow side of the threshold line, and if flow instability is detected, determining a flow rate $W_{S-O}$ at surge, at the measured compressor pressure ratio PR, based on the first compressor map $MAP_O$, and for determining that there is a risk of surge when $W_m$ differs from $W_{S-O}$ by less than a predetermined tolerance, and if no flow instability is detected, determining that the inlet-adjustment mechanism is operating normally.

* * * * *